United States Patent
Spaziante et al.

(10) Patent No.: US 10,115,993 B2
(45) Date of Patent: Oct. 30, 2018

(54) ALL-VANADIUM REDOX FLOW BATTERY SYSTEM EMPLOYING A $V^{+4}/V^{+5}$ REDOX COUPLE AND AN ANCILLARY $CE^{+3}/CE^{+4}$ REDOX COUPLE IN THE POSITIVE ELECTROLYTE SOLUTION

(71) Applicant: Hydraredox Technologies Holdings Ltd., Wirral (GB)

(72) Inventors: Placido Maria Spaziante, Bangkok (TH); Michael Dichand, Nussdorf (AT)

(73) Assignee: HYDRAREDOX TECHNOLOGIES HOLDINGS LTD., Wirral (GB)

( * ) Notice: Subject to any disclaimer, the term of this patent is extended or adjusted under 35 U.S.C. 154(b) by 412 days.

(21) Appl. No.: 14/766,638

(22) PCT Filed: Feb. 14, 2013

(86) PCT No.: PCT/IB2013/051199
§ 371 (c)(1),
(2) Date: Aug. 7, 2015

(87) PCT Pub. No.: WO2014/125331
PCT Pub. Date: Aug. 21, 2014

(65) Prior Publication Data
US 2015/0380760 A1    Dec. 31, 2015

(51) Int. Cl.
*H01M 8/18* (2006.01)
*H01M 8/20* (2006.01)

(52) U.S. Cl.
CPC ............ *H01M 8/188* (2013.01); *H01M 8/20* (2013.01); *H01M 2250/10* (2013.01); *Y02B 90/14* (2013.01); *Y02E 60/528* (2013.01)

(58) Field of Classification Search
CPC .......... H01M 8/18; H01M 8/188; H01M 8/20; H01M 2/40; H01M 2/30
See application file for complete search history.

(56) References Cited

U.S. PATENT DOCUMENTS

| 2004/0029019 A1* | 2/2004 | Clarke | H01M 4/8631 |
| | | | 429/347 |
| 2011/0318644 A1* | 12/2011 | Zhai | C08J 5/225 |
| | | | 429/249 |

(Continued)

FOREIGN PATENT DOCUMENTS

| EP | 2485312 | 8/2012 |
| JP | 2002175831 | 6/2002 |

(Continued)

OTHER PUBLICATIONS

Fang, B., et al., A Study of the Ce(III)/Ce(IV) Redox . . . , Electrochimica Acta, vol. 47, No. 24, pp. 3971-3976, 2002.

(Continued)

*Primary Examiner* — Kenneth J Douyette
(74) *Attorney, Agent, or Firm* — Lucas & Mercanti, LLP

(57) ABSTRACT

An ancillary $Ce^{+3}/Ce^{+4}$ redox couple is added to the positive electrolyte solution containing the $V^{+4}/V^{+5}$ redox couple of an RFB energy storage system in a mole content sufficient to support charge current in case of localized depletion of oxidable $V^{+4}V$ ions in the anode double layer on a wetted carbon electrode surface at a polarization voltage approaching 1.5 V, thus restraining any further increase that would lead to massive $OH^-$ discharge on the carbon electrode. Such a "buffering" function of the fraction of oxidable of $C^{+3}$ ions, substitutes of no longer present oxidable $V^{+4}$ ions, may eventually continue after a substantially complete oxidation to $V^{+5}$ of the vanadium of the main redox couple $V^{+4}/V^{+5}$ in the positive electrolyte solution and to this end a balancing mole amount of a reducible redox couple is also added to the negative electrolyte solution. Of course, the added fractions (concentrations) of ancillary redox couple element or elements in the two electrolyte solutions will be determined in function of the minimum time interval after full oxidation of (Continued)

the vanadium load the system may remain operating before stopping an inadvertent run out charging process (maximum tolerable overcharge).

10 Claims, 1 Drawing Sheet

(56) References Cited

U.S. PATENT DOCUMENTS

2012/0282509 A1* 11/2012 Shigematsu .......... H01M 8/188
　　　　　　　　　　　　　　　　　　429/109
2013/0004819 A1* 1/2013 Mun .................... H01M 8/188
　　　　　　　　　　　　　　　　　　429/106

FOREIGN PATENT DOCUMENTS

| JP | 2011233373 | 11/2011 | | |
|----|------------|---------|---|---|
| WO | 2010094657 | 8/2010 | | |
| WO | WO-2012/020277 A1 * | 2/2012 | .............. | H01M 8/20 |

OTHER PUBLICATIONS

International Search Report issued in PCT Application No. PCT/IB2013/051199.

* cited by examiner

ALL-VANADIUM REDOX FLOW BATTERY SYSTEM EMPLOYING A $V^{+4}/V^{+5}$ REDOX COUPLE AND AN ANCILLARY $CE^{+3}/CE^{+4}$ REDOX COUPLE IN THE POSITIVE ELECTROLYTE SOLUTION

CROSS-REFERENCE TO RELATED APPLICATIONS

This application is a 371 of PCT/IB2013/051199, filed Feb. 14, 2013.

BACKGROUND

Technical Field

This disclosure relates in general to redox flow battery (RFB) systems for energy storage, and in particular to the so-called all-vanadium RFB system. This disclosure addresses the problem of accidental oxygen discharge on a carbon base, positive electrode during charging and of undue precipitations in an overcharged positive electrolyte solution.

Related Art

RFB energy storage systems [1-7] are recognized as particularly efficient and flexible candidates for large scale energy storage requirements of intelligent power distribution networks being developed.

The all-vanadium (V/V) RFB system using the redox couples $V^{+2}/V^{+3}$ in the negative electrolyte solution and $V^{+4}/V^{+5}$ in the positive electrolyte solution is probably the one that has had significant industrial applications that is still most extensively studied. Other similar RFB systems like Fe/V, V/Br, Cr/Fe, Zn/Ce, Polysulfide/Br, have been studied but have not had a comparable commercial acceptance. A common feature to these systems is that, for economically acceptable current densities to be supported, porous and fluid permeable electrodes are necessary. Moreover, chemical inertness of the electrode materials that need to be retained when switching from cathodic polarization to anodic polarization during a cycle of charging and discharging of the redox storage system, and the requisite of having a relatively high $H^+$ discharge overvoltage when negatively polarized in respect to the electrolyte solution and a high $OH^-$ discharge overvoltage when positively polarized in respect to the electrolyte solution, obliges to use carbon base electrodes.

Yet, preventing parasitic $OH^-$ discharge and/or $H^+$ discharge in case of localized depletion of oxidable and reducible vanadium ions of the respective redox couples in the two solutions because of non uniform mass transport and/or electrical potential throughout porous electrode felts of non woven activated carbon fibers, generally sandwiched between the ion permeable cell separating membrane and the surface of a conductive current distributing plate, remains a critical aspect.

Parasitic oxygen discharge at the carbon electrode may accidentally becomes the main current supporting anodic reaction if the design maximum current density limit is for some reason surpassed or if the charging process is accidentally protracted beyond full vanadium oxidation in the positive electrolyte solution to $V^{+5}$. In the latter event, another serious effect may start to manifest itself, notably a gradual precipitation of vanadium pentoxide according to the reaction: $2VO_2^+ + H_2O = V_2O_5 + 2H^+$.

The first of these hazardous occurrences may lead to a rapid destruction of the carbon felt and of the carbon-based current collecting plates by nascent oxygen with generation of CO and $CO_2$. For this reason many substances have been identified as poisoning agents of oxygen evolution on carbon anodes in the typical sulphuric acid electrolyte solutions of vanadium RFBs like antimony ($Sb^{+3}$), Borax and tellurium ($Te^{+4}$), generally preferred because besides raising the oxygen evolution overvoltage, they also poisons $H^+$ discharge in case of migration/contamination of the negative electrolyte solution. The second occurrence, if unchecked, causes clogging, particularly difficult to remedy, specially in the pores of the carbon felt electrode and unbalancing of the electrolytes. As it is well known, parasitic hydrogen evolution in a vanadium RFS energy storage cell may be favoured by accidental contamination of the electrolyte solutions with metals having a low hydrogen overvoltage like Fe, Ni, Co, Pt, Pd . . . etc. that may deposit on the carbon electrode structure, and/or when $V^{+3}$ has been completely reduced to $V^{+2}$ in which case the only electrode reaction that may support circulation of electric current becomes the electrolysis of water.

Specific monitoring of working conditions in the cells is indispensable and its shortcomings have been the cause of costly failures. More sophisticated and reliable ways of controlling the operation of RFB energy storage systems are been developed.

Prior patent application No. PCT/IB2012/057342, of the same applicants, discloses a reliable monitoring system of the operation conditions that provides a long sought detectability at single cell level, impossible with the multi-cell bipolar stacks typical of known industrial all-vanadium flow redox batteries. The content of his prior patent application is herein incorporate by express reference.

OBJECTIVES AND SUMMARY OF THE DISCLOSURE

Notwithstanding instrumental monitoring of operation parameters and real time processing of acquired data for generating alarms and/or automatically actuating effective correction measures, a comfortably intrinsic self-buffering ability of an electrochemical flow redox system based on the use of the $V^{+4}/V^{+5}$ redox couple in the positive electrolyte solution of an RFB energy storage system in case of accidental surpassing of a condition even in a localized sense, of full conversion of dissolved vanadium to $V^{+5}$, would be of great value.

According to an embodiment, an ancillary $Ce^{+3}/Ce^{+4}$ redox couple is added to the positive electrolyte solution containing the $V^{+4}/V^{+5}$ redox couple of an RFB energy storage system in a mole content sufficient to support charge current in case of localized depletion of oxidable $V^{+4}$ ions in the anode double layer on a wetted carbon electrode surface at a polarization voltage approaching 1.5 V, thus restraining any further increase that would lead to massive $OH^-$ discharge on the carbon electrode.

Such a "buffering" function of the fraction of oxidable of $C^{+3}$ ions, substitutes of no longer present oxidable $V^{+4}$ ions, may eventually continue after a substantially complete oxidation to $V^{+5}$ of the vanadium of the main redox couple $V^{+4}/V^{+5}$ in the positive electrolyte solution and to this end a balancing mole amount of a reducible redox couple is also added to the negative electrolyte solution. Of course, the added fractions (concentrations) of ancillary redox couple element or elements in the two electrolyte solutions will be determined in function of the minimum time interval after full oxidation of the vanadium load the system may remain operating before stopping an inadvertent run out charging process (maximum tolerable overcharge).

In case of an all vanadium RFB system employing a $V^{+2}/V^{+3}$ redox couple in the negative electrolyte solution it will be sufficient to arrange for the presence of a balancing mole amount of $V^{+3}$ ions yet to be reduced whenever a complete oxidation of vanadium to $V^{+5}$ is reached in the positive electrolyte solution.

Alternatively, a balancing mole amount of ancillary $Cr^{+2}/Cr^{+3}$ redox couple may be added also to the main $V^{+2}/V^{+3}$ redox couple in the negative electrolyte solution. This alternative has the advantage of contributing to enhancing the cell open circuit voltage because of the more negative standard reduction potential of $Cr^{+3}$ (−0.41V) compared to that of $V^{+3}$ of the negative electrolyte solution, adding to the enhancement due to the more positive standard oxidation potential of $Ce^{+3}$ (1.46V) compared to that of $V^{+4}$ of the positive electrolyte solution.

According to a further embodiment, instead of a typical sulphuric acid positive electrolyte solution containing a given amount of dissolved vanadium of the main $V^{+4}/V^{+5}$ redox couple and of a lesser amount of dissolved cerium of the ancillary $Ce^{+3}/Ce^{+4}$ redox couple, and trace amounts of at least a poisoning agent of oxygen evolution on carbon anodes of the group comprising antimony ($Sb^{+3}$), Borax and tellurium ($Te^{+4}$), the acid solution is either of methane-sulfonic acid or of a mixture of sulphuric acid and methane-sulfonic acid. The presence of methane-sulfonic acid increases the solubility of cerium allowing concentrations of cerium well beyond 100 mMole/liter that would be a maximum limit in a standard positive sulphuric acid electrolyte solution of vanadium without a methane-sulfonic fraction added to it. Although it would be perfectly possible to use a solution of methane-sulfonic acid, preferably, because of its higher price compared to sulphuric acid, the methane-sulfonic fraction may be generally comprised between 5 and 50% by weight.

Preliminary test evidences, seem to indicate that the presence of cerium ions hinders precipitation of vanadium pentoxide through the reaction: $2VO_2^+ + H_2O = V_2O_5 + 2H^+$, probably by disturbing the polymerization mechanism of nascent molecules of $V_2O_5$, and this appears to be a secondary beneficial result of the addition of cerium in the positive electrolyte solution.

In any case, buffering the $V^{+5}$ ions in the positive electrolyte solution by adding an electron donor Lewis base compound soluble in the acid electrolyte solution, like pyridine, bi-pyridine or benzene derivatives, will practically prevent precipitation of vanadium pentoxide.

DESCRIPTION OF EMBODIMENTS

Throughout this specification, the ionization state notation $V^{+4}$ of vanadium in the acid solution is often used in lieu of the ionic notation of the corresponding oxide $VO^{+2}$, and the ionization state notation $V^{+5}$ in lieu of the ionic notation of the corresponding oxide $VO_2^+$.

The typical electrolyte used in an all vanadium redox flow battery (RFB) system of the prior art is an aqueous solution containing 1 to 2 mole of vanadium and 4 to 5 moles of sulphuric acid (notably, the actual free portion of sulphuric acid changes during the conditioning and thereafter during the charging and discharging processes). During charge, when the vanadium contained in the positive electrolyte solution is almost all oxidized to pentavalent vanadium and the open circuit cell voltage reaches the range of 1.50-1.55 Volt, the only reaction that can occur at the positive electrode (that is anodically polarized during charge) is the highly detrimental evolution of oxygen gas.

According to this disclosure, to the positive acid vanadium sulphate electrolyte solution is added a minor molar amount of cerium, soluble in the sulphuric acid vanadium solution, the redox ion couple of which $Ce^{+3}/Ce^{+4}$ has a standard redox potential of 1.46 V, that is higher than the redox potential of the $V^{+4}/V^{+5}$ redox couple and a an inhibitor compound (a poison) of oxygen evolution on the carbon electrode (anode) of the cell.

In normal operation of the RFB, the added cerium ions $Ce^{+3}$ will not start to be oxidized until a significant amount of $V^{+4}$ ions remains to be oxidized to $V^{+5}$ nor interfere with such an electrode reaction until vanadium is completely oxidized to $V^{+5}$.

Figure 1:
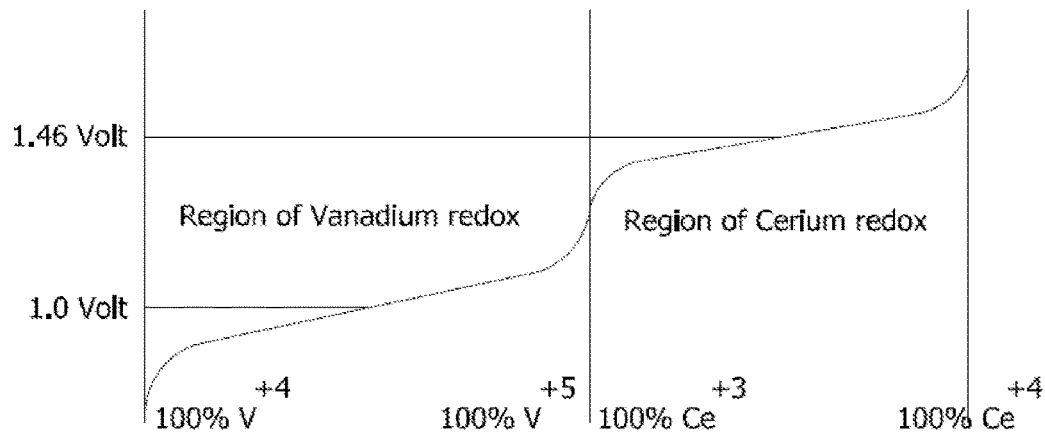
FIG. 1 is a diagram of the electrochemical potential of the redox region of vanadium and of the redox region of cerium.

Considering that the standard potential of oxidation of the vanadium content is about 1.0 Volt (standard means when the concentration of $V^{+4}$ is equal to the concentration of $V^{+5}$), then the potential required for starting to oxidize (i.e. electrically charging the positive electrolyte solution) $V^{+4}$ to $V^{+5}$ is 1.0 Volt, and the potential of oxidation gradually increases as the proportion of $V^{+5}$ versus $V^{+4}$, following the Nernst logarithmic relationship. When substantially all the $V^{+4}$ ions are oxidized to $V^{+5}$, the oxidation potential will have approximately reached about 1.4 V, and at this voltage $Ce^{+3}$ ions will start oxidizing to $Ce^{+4}$. FIG. 1 provides a graphical illustration of the oxidation potential characteristic of a charge process in the positive electrolyte solution of an RFB system, according to a basic embodiment of this disclosure.

At such threshold level of oxidation potential, a parasitic anode reaction of oxygen discharge (evolution) may be avoided by increasing the oxygen over-potential on the positive electrode with specific additives in the positive electrolyte solution.

For example small amount of metals such as Au, In, Pb, Sb, Te or of $Na_2B_4O_7$ will inhibit oxygen evolution by raising the discharge overvoltage on the carbon electrode well above 2.0 V. In this respect, the most effective additives are antimony ($Sb^{+5}$) and borax because of their ability to raise oxygen overvoltage by more than 70 mV, while $Te^{+4}$ would raise it by just 30 mV, $Au^{+3}$ by 20 mV and $In^{+3}$ by 10 mV. Use of Au imposes precautions because if it accidentally contaminates the negative electrolyte solution it would promote parasitic hydrogen evolution at the negatively polarized electrode.

However, a decisive reason for restricting the choice among antimony, borax and to a lesser degree tellurium is the fact that they, alike lead, have a similar inhibiting effect also on parasitic hydrogen evolution that may take place during the discharge process when the carbon electrode becomes cathodically polarized versus the same positive electrolyte solution. $Sb^{+5}$ increases hydrogen overvoltage by 300 mV), Borax by 220 mV and $Te^{+4}$ by 150 mV, and lead, though being also a strong hydrogen evolution inhibitor tends to precipitate as $PbO_2$ on the carbon electrode at the oxidation potential of $Ce^{+3}$ to $Ce^{+4}$.

The introduced amounts of these inhibitors of parasitic oxygen and hydrogen evolution in the electrolyte solution or solutions may be in a range of few milligrams per liter of solution and in any case well within the limit of solubility of the selected ions.

The solubility of cerium sulphate (of both $Ce_2(SO_4)_3$ and $Ce(SO_4)_2$ salts) decreases with increasing concentration of free sulphuric acid and for the objectives of this disclosure may remain below 100 mMole/liter. Both $Ce^{+3}$ and $Ce^{+4}$ form complexes with sulphuric acid and these complexes solubilize the cerium ions. Cerium ions may be bound to less or more $SO_4^=$ groups creating negative or positive soluble complex ions. The relatively slow kinetics and the complexity mechanism of precipitation of cerium sulphate allows operation of the redox reactions in regions of oversaturated solutions of the solubility characteristic of cerium sulphate, alike what normally happens in the all vanadium RFB system.

According to an embodiment of implementation with sulphuric acid only, cerium concentration may be limited to a range from about 100 to 500 mMole/liter. Considering that normally there are 1500 mMole/liter of vanadium, the contribution the added cerium to electricity storage capacity will be limited to about 7% to 30%, but the real (main) function of cerium is to provide a safety buffer condition that will avoid oxygen ion discharge in case of accidental general or localized depletion of $V^{+4}$ ions oxidable to $V^{+5}$. The added cerium will act as a buffer for keeping the anode voltage of polarization with respect to the electrolyte solution down to the level of the oxidation overvoltage of the couple $Ce^{+3}/Ce^{+4}$ by absorbing electrons for a substantial period of time tied to the charge current and the molar content of cerium.

According to another embodiment, the acid used in the electrolyte solution may not be sulphuric acid but methane-sulfonic acid that besides the vanadium it is able to solubilize cerium comfortably up to and even over 500 mMole/liter.

This acid has been used for solubilizing cerium (as the positive side redox couple) in the Zinc/Cerium, called "Plurion", as well as for solubilizing lead sulphate in other proposed semi-RFB systems, using lead as the positive side redox couple.

Yet another embodiment is to use a mixture of sulphuric acid and methane-sulfonic acid in sufficient ratio to allow a higher solubility of cerium sulphate. An increased fraction of methane-sulfonic acid in respect to sulphuric acid will bring into solution increasing quantities of cerium sulphate.

Although a balancing same molar amount of cerium may be added also in the negative electrolyte solution of vanadium to provide for a similarly ancillary $Cr^{+3}/Cr^{+2}$ couple, capable of supporting the cathodic reaction in case of general or localized depletion of reducible $V^{+3}$ ions, or of an accidental overcharge of the vanadium RFB system, preventing parasitic hydrogen discharge (poisoned by the above indicated inhibitors). However, for the negative side, the same balancing is preferably and more economically done by a proportionate increment of the molar amount of vanadium (i.e. of the main $V^{+2}/V^{+3}$ redox couple) in the negative electrolyte solution.

For example if 0.3 mole/liter of cerium are added to a positive electrolyte solution containing 1.5 mole/liter of vanadium, the volume of the same vanadium electrolyte solution in the negative electrolyte solution circuit may be incremented of 1/5, which corresponds to a volumetric ratio of 1.25 liter of negative electrolyte solution for each liter of positive electrolyte solution).

Figure 2:
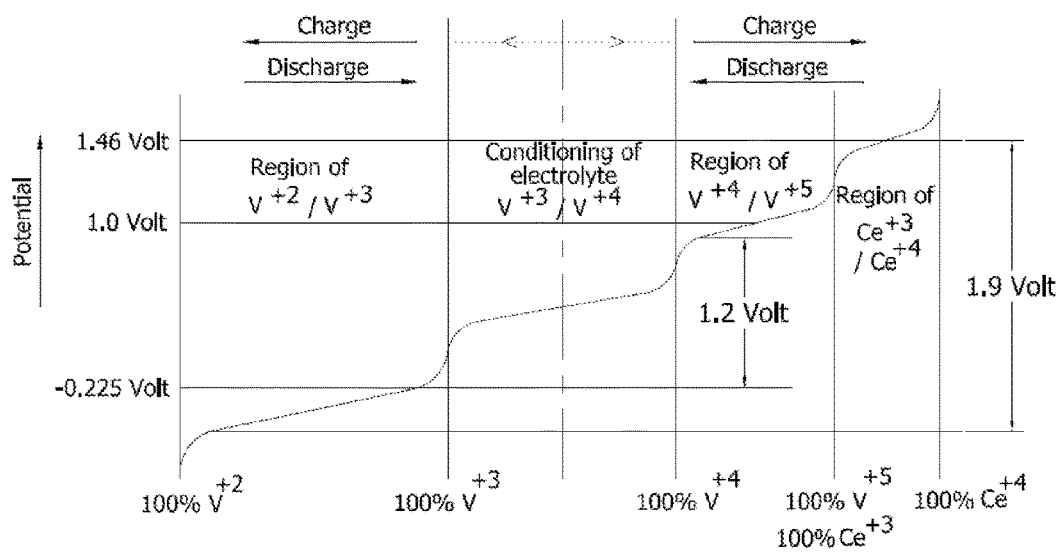
FIG. 2 is a diagram showing the electrochemical potential characteristic curve and the open circuit cell voltage for the distinct phases of charging and discharging of a vanadium RFB system with ancillary cerium redox couple in the positive electrolyte solution, according to this disclosure.

FIG. 2 illustrates the electrochemical potentials at the cell electrodes and the open circuit cell voltage throughout charge and discharge processes. The cell voltage will be approximately 1.2 V when the electrolytes are fully discharged and 1.9 Volt when fully charged.

As disclosed in the above mentioned prior application of the same applicants, possible accidental differences of the actual cell voltage among single cells and current density differences among cell electrodes no longer constitute hidden risk conditions with a monopolar cell architectural approach of the all vanadium RFB system and the intrinsic safeguard against accidental overcharge, as well as against hardly undetectable, short-lived localized conditions of excessive depletion of anodically oxidable $V^{+4}$ ions at the positive carbon electrodes and/or of cathodically reducible $V^{+3}$ ions at the negative carbon electrodes prevent rapid degradation of the positive electrodes besides incrementing galvanic efficiency and avoiding degassing problems and other inconveniences.

A noted attendant beneficial effect of adding cerium in the positive electrolyte solution appears to be a consequence of introduction in the sulphuric acid vanadium solution of substances like $Ce^{+3}$ and $Ce^{+4}$ and methane-sulfonic acid. Preliminary experimental results show that the presence of the cerium ions as well as the presence of methane-sulfonic acid is of hindrance to the tendency to precipitate of vanadium pentoxide. A possible explanation of this effect may be tied to the fact that precipitation of vanadium pentoxide appears to occur through a polymerization process of vanadium oxide molecules. Any disturbance in the process of formation of the polymer would hinder/retard the process. Indeed, the presence of cerium ions may disturb the polymerization of the vanadium oxide molecules thus retarding it. Even the presence of methane-sulfonic acid appears to have a retarding effect possibly because of an anti-coagulant action of the $VO_2^+$ ions.

Precipitation of vanadium pentoxide occurs according to the reaction:

$$2VO_2^+ + H_2O = V_2O_5 + 2H^+.$$

A high concentration of $H^+$ delays but does not prevent precipitation that eventually begins to manifest itself at temperatures above 50° C. The concentration of vanadium will also influence the kinetics of this reaction: a lower concentration will delay precipitation but at temperature of 80-100° C. even at a concentration of 0.1 mole/liter there will be precipitation of vanadium pentoxide.

According to the applicants beliefs, precipitation occurs because the $VO_2^+$ ion is a strong oxidizing agent or in other words a strong electron acceptor and attracted by electron donor molecules. Sulphuric acid or better the $SO_4^{-2}$ ion is an electron donor of medium strength and to a certain extend satisfy the needs of $VO_2^+$ making stable solvating adducts, but at temperatures above 50° C., $VO_2^+$ begins attacking and oxidizing water molecules (subtracting electrons from the oxygen of the water molecules) according to the following reaction:

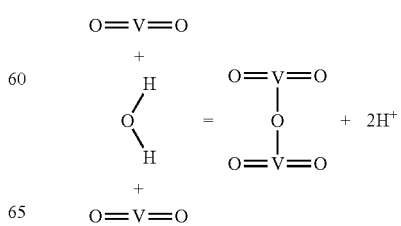

By providing a strong electron donor substance in the acid solution, $VO_2^+$ will share the electrons of the strong electron donor rather than attacking the water molecule.

Professor Maria Kazacos disclosed an overwhelmingly large number of electron donor organic molecules, but most of them do not to withstand the strong oxidation power of $VO_2^+$. $V^{+4}$ oxidizes sugar at 100° C. in presence of a catalyst whilst $V^{+5}$ is able to oxidize any weak (aliphatic) organic compounds at room temperature, without any catalyst.

Professor Larsson did better for the SuFuCell, where $VO_2^+$, produced by the oxidation of $V^{+4}$ using air at 100° C., has to stably remain in solution at that temperature in order to flow in the negative electrode compartment of the cell where it is cathodically reduced to $V^{+4}$ at the electrodes. To achieve this, Prof. Larsson used a very strong donor compound: pyridine. In fact, the organic ring of pyridine is very stable and it is not oxidized by $VO_2^+$.

Pyridine act as Lewis base, donating its pair of electrons to a Lewis acid, as in the sulfur trioxide pyridine complex.

The applicants have verified experimentally that by adding pyridine, bi-pyridine or benzene into the positive electrolyte solution containing the $V^{+4}/V^{+5}$ and the $Ce^{+3}/Ce^{+4}$ redox couples of the vanadium RFB systems of this disclosure precipitation of vanadium pentoxide ($VO_2^+$) is effectively prevented even at temperatures as high as 100° C.

The various embodiments described above can be combined to provide further embodiments. Other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

REFERENCES

[1]. Review of "*Redox flow cells for energy conversion*", C. Ponce de Leon, A. Frias-Ferrer, J. Gonzalez-Garcia, D. A. Szanto, F. C. Walsh, Elsevier, Journal of Power Sources 160 (2006), pages: 716-732;

[2]. "*Novel vanadium chloride/polyhalide redox flow battery*", Maria Skyllas-Kazacos, Elsevier, Journal of Power Sources 124 (2003), pages: 299-302;

[3]. "*A study of the Ce(III)/Ce(IV) redox couple for redox flow battery application*", B. Fang, S. Iwasa, Y. Wei, T. Arai, M. Kumagai, Elsevier, Electrochimica Acta 47 (2002), pages 3971-3976;

[4]. "*Chromium redox couples for application to redox flow batteries*", C.-H. Bae, E. P. L. Roberts, R. A. W. Dryfe, Pergamon, Electrochimica Acta 48 (2002), pages: 279-287;

[5]. "*Redox potentials and kinetics of the Ce3þ/Ce4þ redox reaction and solubility of cerium sulphates in sulphuric acid solutions*", A. Paulenovaa, S. E. Creagerb, J. D. Navratila, Y. Weic, Elsevier, Journal of Power Sources 109 (2002), pages: 431-438;

[6]. "*A novel flow battery-A lead acid battery based on an electrolyte with soluble lead(II)IV. The influence of additives*", Ahmed Hazza, Derek Pletcher, Richard Wills, Elsevier, Article in Press, Journal of Power Sources xxx (2005) xxx-xxx;

[7]. "*A novel flow battery-A lead acid battery based on an electrolyte with soluble lead(II) III. The influence of conditions on battery performance*", Elsevier, Journal of Power Sources 149 (2005) 96-102.

The invention claimed is:

1. A redox flow battery, energy storage system employing a $V^{+4}/V^{+5}$ redox couple in a positive electrolyte solution and a $V^{+2}/V^{+3}$ redox couple in a negative electrolyte solution of a redox flow electrochemical cell, comprising an ancillary $Ce^{+3}/Ce^{+4}$ redox couple present in said positive electrolyte solution in a mole content from about 100 to 500 mMole/liter sufficient to support charge current in case of a substantially complete oxidation of vanadium of the redox couple in the solution and a balancing mole amount of a reducible redox couple added in the negative electrolyte solution.

2. The redox flow battery, energy storage system of claim 1, wherein said balancing mole amount of a reducible redox couple added in the negative electrolyte solution is selected from the group consisting of $V^{+2}/V^{+3}$ and $Cr^{+2}/Cr^{+3}$.

3. The redox flow battery, energy storage system of claim 1, wherein at least said positive electrolyte solution further comprises a minor amount of antimony, sodium borate or tellurium, to increase oxygen discharge overvoltage.

4. The redox flow battery, energy storage system of claim 1, wherein said electrolyte solutions are sulphuric acid solutions, methane-sulfonic acid solutions or mixtures thereof.

5. The redox flow battery, energy storage system of claim 2, wherein said electrolyte solutions contain also methane sulphonic acid.

6. The redox flow battery, energy storage system of claim 1, wherein said ancillary and additional mole contents of the two electrolyte solutions are adapted to support charge current beyond full vanadium oxidation for a given maximum time limit, preventing inadvertent oxygen discharge on the positive electrode of the redox flow electrochemical cell.

7. The redox flow battery, energy storage system of claim 1, further comprising an anticoagulant agent in said positive electrolyte solution and/or magnetic means adapted to subject the streaming positive electrolyte solution to a magnetic field.

8. The redox flow battery, energy storage system of claim 7, wherein said anticoagulant agent in said positive electrolyte solution is an electron donor Lewis base compound soluble in the acid electrolyte solution.

9. The redox flow battery, energy storage system of claim 7, wherein said anticoagulant agent in said positive electrolyte solution is selected from the group consisting of pyridine, bi-pyridine and benzene.

10. The redox flow battery, energy storage system of claim 1, wherein the system inhibits precipitation of vanadium pentoxide up to 80° C.

* * * * *